United States Patent
Jiang et al.

(10) Patent No.: US 10,790,513 B2
(45) Date of Patent: Sep. 29, 2020

(54) LITHIUM ION BATTERY AND NEGATIVE ELECTRODE THEREOF

(71) Applicant: Ningde Amperex Technology Limited, Ningde, Fujian (CN)

(72) Inventors: Jing Jiang, Fujian (CN); Qiao Zeng, Fujian (CN); Kefei Wang, Fujian (CN)

(73) Assignee: Ningde Amperex Technology Limited, Ningde (CN)

( * ) Notice: Subject to any disclaimer, the term of this patent is extended or adjusted under 35 U.S.C. 154(b) by 92 days.

(21) Appl. No.: 16/138,903

(22) Filed: Sep. 21, 2018

(65) Prior Publication Data
US 2019/0097237 A1 Mar. 28, 2019

(30) Foreign Application Priority Data

Sep. 26, 2017 (CN) .......................... 2017 1 0883321

(51) Int. Cl.
*H01M 4/62* (2006.01)
*H01M 10/0525* (2010.01)
(Continued)

(52) U.S. Cl.
CPC .......... *H01M 4/624* (2013.01); *H01M 4/133* (2013.01); *H01M 4/364* (2013.01); *H01M 4/366* (2013.01);
(Continued)

(58) Field of Classification Search
CPC ...... H01M 4/624; H01M 4/133; H01M 4/364; H01M 4/366; H01M 4/587; H01M 4/628;
(Continued)

(56) References Cited

U.S. PATENT DOCUMENTS

| | | | | |
|---|---|---|---|---|
| 6,300,009 B1 * | 10/2001 | Yoshida | ............... | C01G 39/006 |
| | | | | 429/218.1 |
| 2008/0137316 A1 * | 6/2008 | Khaselev | ................. | H05K 1/09 |
| | | | | 361/772 |

(Continued)

FOREIGN PATENT DOCUMENTS

| CN | 100492727 C | 5/2009 |
|---|---|---|
| CN | 102593416 A | 7/2012 |

(Continued)

OTHER PUBLICATIONS

Shi et al. "Self-assembly of hiearchial MoSx/CNT nanocompsoites (2<x<3): towards high performance anode materials for lithium ion batteries" Scientific Reports 3, Article 2169, p. 1-8 (Year: 2013).*

(Continued)

*Primary Examiner* — Susan D Leong

(57) ABSTRACT

The present application provides a lithium ion battery and a negative electrode thereof. The negative electrode comprises: a negative electrode active material layer and an additive comprising a metal sulfide, wherein the additive is distributed in the negative electrode active material layer, distributed on the surface of the negative electrode active material layer, or both in the negative electrode active material layer and on the surface of the negative electrode active material layer. The negative electrode of the present application may effectively improve the performance of the lithium ion battery, and greatly improve the capacity and cycle performance of the lithium ion battery.

18 Claims, 2 Drawing Sheets

(51) Int. Cl.
- *H01M 4/36* (2006.01)
- *H01M 4/587* (2010.01)
- *H01M 4/133* (2010.01)
- *H01M 4/02* (2006.01)

(52) U.S. Cl.
CPC ........... *H01M 4/587* (2013.01); *H01M 4/628* (2013.01); *H01M 10/0525* (2013.01); *H01M 2004/021* (2013.01); *H01M 2004/027* (2013.01)

(58) Field of Classification Search
CPC ................. H01M 4/02; H01M 4/5815; H01M 2004/027; H01M 2004/021; H01M 10/0525

See application file for complete search history.

(56) References Cited

U.S. PATENT DOCUMENTS

| | | | |
|---|---|---|---|
| 2012/0077082 A1* | 3/2012 | Se-Hee | H01M 4/485 429/209 |
| 2013/0224603 A1* | 8/2013 | Chen | B82Y 30/00 429/322 |
| 2018/0130978 A1* | 5/2018 | Roy | H01M 2/0202 |
| 2019/0051904 A1* | 2/2019 | Zhamu | H01M 4/134 |

FOREIGN PATENT DOCUMENTS

| | | |
|---|---|---|
| CN | 103915622 A | 7/2014 |
| CN | 102593416 B | 8/2014 |
| JP | S55137669 A * | 4/1979 |

OTHER PUBLICATIONS

Shi et al. Supplementary Information Supporting information for "Self-assembly of hiearchial MoSx/CNT nanocompsoites (2<x<3): towards high performance anode materials for lithium ion batteries". p. 1-4 (Year: 2013).*

Furukawa Sanehiro et al. JPS55137669A, English equivalent of the abstract (Year: 1979).*

* cited by examiner

LITHIUM ION BATTERY AND NEGATIVE ELECTRODE THEREOF

CROSS-REFERENCE TO RELATED APPLICATION

This application claims priority to and benefits of Chinese Patent Application Serial No. 201710883321.4, filed with the State Intellectual Property Office of P. R. China on Sep. 26, 2017, and the entire content of which is incorporated herein by reference.

FIELD OF THE APPLICATION

The embodiments of the present application relate to the field of battery, in particular, to a lithium ion battery and a negative electrode thereof.

BACKGROUND OF THE APPLICATION

At present, carbon materials with relatively high capacity and long cycle life, such as graphite, are widely used as the negative electrode material of lithium ion battery, and with the increase in demand for high capacity and high energy density, further challenges to the further increase in the capacity of carbon materials have been raised.

The silicon alloy material is recognized as a material having a high capacity, but the expansion during the cycle is large, and particles are pulverized after the repeated charge and discharge, resulting in capacity decay.

Therefore, it has become important to increase the capacity and cycle performance based on the carbon material as the negative electrode.

SUMMARY OF THE APPLICATION

In order to overcome the above problems existing in the prior art, some embodiments of the present application provide a negative electrode comprising a negative electrode active material layer. In the negative electrode active material layer, using a metal sulfide having high conductivity and inercalation/deintercalation of lithium as an additive or applying an additive on the surface of the active material layer is advantageous in reducing impedance and exerting a higher capacity; and the sulfur ions in the additive may precipitate the positive electrode metal ions to prevent dissolution on the surface of the negative electrode, thereby effectively improving the cycle performance of the lithium ion battery.

Further, the additive is combined with a negative electrode active material capable of intercalating and deintercalating lithium, so that the negative electrode active material may exist in the gap between the copper sulfide and cuprous sulfide composed of the nanosheet to form an effective conductive network, thereby promoting ion and electron transport during charge and discharge and effectively improving the conductivity of materials; and also, it provides a fast path for the transmission of electrons and ions, alleviates the volume expansion of the negative electrode material during charge and discharge, and further improves the cycle performance of the lithium ion battery. Some embodiments of the present application provide a negative electrode comprising a negative electrode active material layer and an additive comprising a metal sulfide.

In the above negative electrode, the additive accounts for 0.1% to 6% of the total mass of the negative electrode active material layer and the additive.

In the above negative electrode, the additive has a particle diameter of 1 μm to 50 μm.

In the above negative electrode, wherein the additive is distributed in the negative electrode active material layer, distributed on the surface of the negative electrode active material layer, or both in the negative electrode active material layer and on the surface of the negative electrode active material layer.

In the above negative electrode, the metal sulfide comprises one or more of copper sulfide, cuprous sulfide, molybdenum disulfide, and iron disulfide.

In the above negative electrode, the metal sulfide is copper sulphide and cuprous sulfide.

In the above negative electrode, the morphology of the additive comprises one or more of nanosheets, nanorods, nanotubes, nanowires, nanoparticles, clusters formed of nanosheets.

In the above negative electrode, the nanosheet has a thickness of 1 nm to 200 nm.

In the above negative electrode, wherein the additive further comprises a metal oxide having a chemical formula of $M_xO_y$; M is selected from at least one of Co, Mn, Ni, Cu and Fe, x is an integer of 1 to 3, and y is an integer of 1 to 4.

In the above negative electrode, the additive comprises at least three of copper sulfide, cuprous sulfide, copper oxide, and cuprous oxide.

In the above negative electrode, negative electrode active material wherein inorganic particles are distributed on the surface of the negative electrode active material layer; the inorganic particles are one or more of $Al_2O_3$, $SiO_2$, MgO, $TiO_2$, $ZrO_2$, BaO, magnesium hydroxide, and boehmite.

Embodiments of the present application also provide a lithium ion battery comprising the above negative electrode.

The present application effectively improves the cycle performance of a lithium ion battery and lowers the impedance while maintaining the capacity by adding an additive to the negative electrode active material layer or applying the additive on the surface of the negative electrode active material layer.

BRIEF DESCRIPTION OF THE ACCOMPANYING DRAWINGS

DETAILED DESCRIPTION OF THE PREFERRED EXAMPLES

Figure 1:
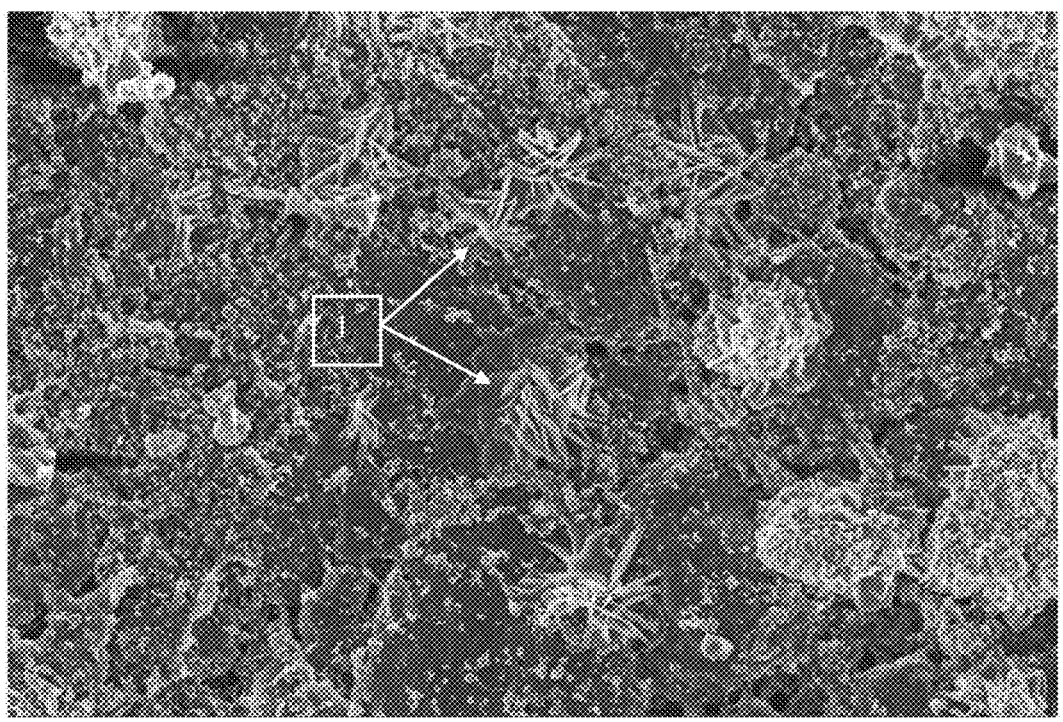
FIG. 1 shows a scanning electronic microscope (SEM) image of a negative electrode material at 1000 times magnification according to Example 5 of the present application (1—additive).

The following embodiments are provided to enable those skilled in the art to understand the present application more fully, but do not limit the application in any way.

The present application effectively improves the cycle performance of a lithium ion battery and lowers the impedance while maintaining the capacity by adding an additive to the negative electrode active material layer or applying the additive on the surface of the negative electrode active material layer, by selecting the type, content, position, particle size, etc. of the additive, or by combining the additive with a negative electrode active material capable of intercalating and deintercalating lithium. The applicant has found that when carbon materials and metal sulfides are combined as negative electrode materials for lithium ion batteries, the stable structure thereof is very suitable for storing lithium ions. In addition, the larger specific surface area of the structure may reduce the transport path of lithium ions, and has a certain mitigation effect on volume expansion during charge and discharge. In the process of lithium ion intercalation, the volume change is small.

Embodiments of the present application provide a negative electrode of lithium ion battery. The negative electrode comprises a negative electrode current collector and a negative electrode active material layer applied on the negative electrode current collector, and the negative electrode active material layer comprises a negative electrode active material, an additive, a binder, a conductive agent, a thickener etc. . . . Among them, the negative electrode current collector may employ a copper (Cu) foil, however, other negative electrode current collectors commonly used in the art may be employed. The negative electrode active material is a carbon material capable of intercalating and deintercalating lithium, including but not limited to one or more of soft carbon, hard carbon, mesocarbon microbeads (MCMB), mesophase carbon fibers, artificial graphite, and natural graphite. The binder is an organic material that makes a contact among the negative electrode active material, between the negative electrode active material layer and the current collector, and includes, but is not limited to, one or more of styrene-butadiene rubber, polyvinylidene fluoride, and derivatives thereof. The conductive agent includes, but is not limited to, acetylene black. The thickener includes, but is not limited to, sodium carboxymethylcellulose. The median diameter (D50) of the negative electrode active material in the negative electrode active material layer is 6 to 40 μm. The mass ratio of the negative electrode active material, the binder, the conductive agent, and the thickener in the negative electrode active material layer may be 90-95:1-4:1-3:0-2. However, the mass ratio may be any other suitable value.

The additive comprises a metal sulfide including, for example, one or more of copper sulfide, cuprous sulfide, molybdenum disulfide and iron disulfide. In addition, the additive may further comprise a metal oxide helping to improve the electrochemical stability of the negative electrode and having a chemical formula of $M_xO_y$, wherein M is selected from one or more of Co, Mn, Ni, Cu and Fe, x is an integer of 1 to 3 (1, 2, 3), and y is an integer of 1 to 4 (1, 2, 3, 4). The ratio of the amount of the metal oxide to the total mass of the additive may be 5% or less, but the present application is not limited thereto. For example, the additive may be $CuS/Cu_2S/CuO$, wherein CuS and $Cu_2S$ may be mixed in any ratio, and the ratio of the mass of CuO to the total mass of the additive is 5% or less. However, it should be understood that the values in the present application are merely examples, and any other suitable values may be included in the scope of the present application.

The morphology of the additive comprises one or more of nanosheets, nanorods, nanotubes, nanowires, nanoparticles and clusters formed of nanosheets. According to some embodiments of the present application, the nanosheet has a thickness of 1 to 200 nm. For example, the clustered surface morphology may effectively improve the defects that the copper sulfide and cuprous sulfide lead to low utilization of the active material and the poor reversibility of the electrode reaction due to its own volume effect, thereby improving the conductivity of the material; and the morphology may alleviate the volume expansion caused by repeated intercalation of lithium ions, so that the volume change of the lithium ion battery is further reduced; in addition, the nanocrystallization of the material may shorten the ion transport path, increase the contact area between the material and the electrolyte, and improve the utilization rate of the active material.

The additive accounts for 0.1% to 6% of the total mass of the negative electrode active material layer and the additive. When the percentage of the additive to the total mass of the negative electrode active material layer and the additive is less than 0.1%, the improvement in the performance of the lithium ion battery is not remarkable because the content is too small. On the other hand, when the percentage is higher than 6%, $S^{2-}$ is easily reduced to consume electrons, and causes a large expansion, thereby deteriorating the performance of the lithium ion battery. Further, the additive has a particle diameter of 1 to 50 μm. When the particle size is less than 1 μm, the specific surface area is large, the side reaction is increased to attenuate the cycle capacity. When the particle size exceeds 50 μm, the lithium ion transport path in the solid phase becomes long, and the polarization resistance will be also increased. The particle diameter of the negative electrode active material mixture is 6-40 μm.

By adding a metal sulfide having high conductivity and capable of intercalating/deintercalating lithium, it is advantageous to reduce the impedance; precipitating the positive electrode metal ions by sulfur ions in the metal sulfide to prevent the metal ions from dissolution on the surface of the negative electrode may improve the cycle performance of the lithium ion battery, and when the additive is mixed with other materials, the conductivity of the material may be increased and the utilization ratio of the negative electrode active material may be increased without adding the conductive agent; metal ions, such as manganese ions, may be better precipitated when the coating formed by the additive is on the surface.

Inorganic particles may be distributed on the surface of the negative electrode active material layer; the inorganic particles include, but are not limited to, one or more of $Al_2O_3$, $SiO_2$, MgO, $TiO_2$, $ZrO_2$, BaO, magnesium hydroxide, and boehmite.

Embodiments of the present application also provide a lithium ion battery comprising the above negative electrode. The lithium ion battery comprises a positive electrode, a negative electrode, a separator and an electrolyte. The positive electrode comprises a positive electrode current collector and a positive active material layer applied on the positive electrode current collector, and the positive active material layer comprises a positive active material, a conductive agent, and a binder. The positive electrode current collector may employ an aluminum (Al) foil, however, other positive electrode current collectors commonly used in the art may be employed. The conductive agent and the binder of the positive active material layer can be the same as those of the negative electrode active material layer described above, and will not be described herein. The positive active material includes, but is not limited to, one or more of lithium cobaltate, lithium nickelate, lithium manganate, lithium nickel manganate, lithium nickel cobaltate, lithium iron phosphate, lithium nickel cobalt aluminate, and lithium nickel cobalt manganate. The above positive active material comprises a positive active material which has been doped or coated in the prior art. The mass ratio of the positive active material, the conductive agent, and the binder in the positive active material layer may be 90-95:1-4:1-3. However, the mass ratio may be any other suitable value.

The separator comprises a polyethylene (PE) separator, a polypropylene (PP) separator, and the like. Further, depending on whether the surface of the separator contains a coating and the type of the coating, the separator comprises one or more of a non-coated bare separator, an inorganic particle coated separator, and a polymer coated separator. The electrolyte comprises at least two of dimethyl carbonate (DMC), ethyl methyl carbonate (EMC), diethyl carbonate (DEC), ethylene carbonate (EC), propylene carbonate (PC), and propyl propionate (PP). Further, the electrolyte may additionally comprise at least one of vinylene carbonate (VC), fluoroethylene carbonate (FEC) and a dinitrile compound as an additive for electrolyte, wherein the dinitrile compound comprises succinonitrile (SN).

The positive electrode, the separator, the negative electrode are sequentially wound or stacked into an electrode assembly, and then sealed (for example, in an aluminum plastic film) for encapsulation, and injected with an electrolyte for formation and packaging, thus a lithium ion battery is made. Then, the prepared lithium ion battery is subjected to a performance test and cycle test.

Those skilled in the art will appreciate that the above described methods for preparing the lithium ion battery are merely examples. Other methods commonly used in the art may be employed without departing from the disclosure of the present application.

Some specific examples and comparative examples are listed below to better illustrate the application.

EXAMPLE 1

After the positive active material of lithium cobaltate, the conductive agent of acetylene black, and the binder of polyvinylidene fluoride (PVDF) are thoroughly stirred and mixed uniformly in the N-methylpyrrolidone solvent system according to the mass fraction of 94:3:3, coating is performed on the Al foil for drying and cold pressing to obtain a positive electrode;

After the negative electrode active material of mesocarbon microbeads, the conductive agent of acetylene black, the binder of styrene butadiene rubber (SBR), and the thickener of sodium hydroxymethylcellulose (CMC) are stirred well and mixed well in a deionized aqueous solvent system according to the mass fraction of 92:3:3:1, coating is performed on a Cu foil to form a negative electrode active material layer; then a slurry of an additive of CuS (1 part by mass, a cluster formed of 20 nm thick nanosheets) and ethyl acetate is coated on the surface of the negative electrode active material layer for drying, cold pressing to form a negative electrode;

The positive electrode, the separator, the negative electrode are sequentially wound or stacked so that the separator is located in the middle of the positive and negative electrodes for isolating, and are assembled to obtain an electrode assembly. The electrode assembly is placed in an outer sealing aluminum plastic film, and an electrolyte containing EC and PC is injected, and sealed to obtain a lithium ion battery, and then the prepared lithium ion battery is subjected to performance test and cycle test.

EXAMPLE 2

The preparation method is the same as that of Example 1, except that $FeS_2$ is used as the additive in Example 2.

EXAMPLE 3

The preparation method is the same as that of Example 1, except that $MoS_2$ is used as the additive in Example 3.

EXAMPLE 4

The preparation method is the same as that of Example 1, except that a mixture of CuS and $Cu_2S$ is used as the additive in Example 4.

EXAMPLE 5

The preparation method is the same as that of Example 1, except that a mixture of CuS, $Cu_2S$ and CuO is used as the additive in Example 5, wherein CuO accounts for 3% of the total mass of the additive.

EXAMPLE 6

The preparation method is the same as that of Example 1, except that a mixture of CuS, $Cu_2S$ and $Fe_3O_4$ is used as the additive in Example 6, wherein $Fe_3O_4$ accounts for 4% of the total mass of the additive.

EXAMPLE 7

The preparation method is the same as that of Example 1, except that a mixture of CuS, $Cu_2S$, $Cu_2O$ and CuO is used as the additive in Example 7, wherein $Cu_2O$ and CuO account for 5% of the total mass of the additive.

EXAMPLE 8

The preparation method is the same as that of Example 1, except that a mixture of CuS, $Cu_2S$ and CuO is used as the additive in Example 8, and the mass fraction of the additive is 0.1 parts by mass wherein CuO accounts for 5% of the total mass of the additive.

EXAMPLE 9

The preparation method is the same as that of Example 1, except that a mixture of CuS, $Cu_2S$ and CuO is used as the additive in Example 9, and the mass fraction of the additive is 2 parts by mass wherein CuO accounts for 5% of the total mass of the additive.

EXAMPLE 10

The preparation method is the same as that of Example 1, except that a mixture of CuS, $Cu_2S$ and CuO is used as the additive in Example 10, and the mass fraction of the additive is 4 parts by mass wherein CuO accounts for 5% of the total mass of the additive.

EXAMPLE 11

The preparation method is the same as that of Example 1, except that a mixture of CuS, $Cu_2S$ and CuO is used as the additive in Example 11, and the mass fraction of the additive is 6 parts by mass wherein CuO accounts for 5% of the total mass of the additive.

EXAMPLE 12

The preparation method is the same as that of Example 1, except that in Example 12, the negative electrode active material of mesocarbon microbeads, the additive (a mixture of CuS, $Cu_2S$ and CuO, wherein CuO accounts for 5% of the total mass of the additive), the binder of styrene butadiene rubber (SBR), and the thickener of sodium hydroxymethylcellulose (CMC) are stirred well and mixed to be uniform in a deionized aqueous solvent system according to the mass fraction of 95:1:3:1, coating is performed on a Cu foil to form a negative electrode active material layer.

EXAMPLE 13

The preparation method is the same as that of Example 1, except that in Example 13, the negative electrode active material of mesocarbon microbeads, the additive (a mixture of CuS, $Cu_2S$ and CuO, wherein CuO accounts for 5% of the total mass of the additive), the conductive agent of acetylene black, the binder of styrene butadiene rubber (SBR), and the thickener of sodium hydroxymethylcellulose (CMC) are stirred well and mixed to be uniform in a deionized aqueous solvent system according to the mass fraction of 92:0.6:3:3:1, coating is performed on a Cu foil to form a negative electrode active material layer, and then 0.4 parts by mass of a slurry of the additive CuS, $Cu_2S$, and CuO and ethyl acetate is coated on the surface of the negative electrode active material layer for drying, cold pressing to form a negative electrode.

EXAMPLE 14

The preparation method is the same as that of Example 1, except that a mixture of CuS, $Cu_2S$ and CuO is used as the additive in Example 14, wherein CuO accounts for 5% of the total mass of the additive, and the additive is a 20 nm thick nanosheet.

EXAMPLE 15

The preparation method is the same as that of Example 1, except that a mixture of CuS, $Cu_2S$ and CuO is used as the additive in Example 15, wherein CuO accounts for 5% of the total mass of the additive, and the additive is a 20 nm thick nanostick.

EXAMPLE 16

The preparation method is the same as that of Example 1, except that a mixture of CuS, $Cu_2S$ and CuO is used as the additive in Example 16, wherein CuO accounts for 5% of the total mass of the additive, and the additive is a 20 nm thick nanoparticle.

EXAMPLE 17

The preparation method is the same as that of Example 1, except that a mixture of CuS, $Cu_2S$ and CuO is used as the additive in Example 17, wherein CuO accounts for 5% of the total mass of the additive, and the morphology of the additive is a clustered shape formed by 1 nm thick nanosheets.

EXAMPLE 18

The preparation method is the same as that of Example 1, except that a mixture of CuS, $Cu_2S$ and CuO is used as the additive in Example 18, wherein CuO accounts for 5% of the total mass of the additive, and the morphology of the additive is a clustered shape formed by 10 nm thick nanosheets.

EXAMPLE 19

The preparation method is the same as that of Example 1, except that a mixture of CuS, $Cu_2S$ and CuO is used as the additive in Example 19, wherein CuO accounts for 5% of the total mass of the additive, and the morphology of the additive is a clustered shape formed by 50 nm thick nanosheets.

EXAMPLE 20

The preparation method is the same as that of Example 1, except that a mixture of CuS, $Cu_2S$ and CuO is used as the additive in Example 20, wherein CuO accounts for 5% of the total mass of the additive, and the morphology of the additive is a clustered shape formed by 200 nm thick nanosheets.

EXAMPLE 21

The preparation method is the same as that of Example 1, except that artificial graphite is used as the negative electrode active material in Example 21 and a mixture of CuS, $Cu_2S$ and CuO is used as the additive therein, wherein CuO accounts for 5% of the total mass of the additive.

EXAMPLE 22

The preparation method is the same as that of Example 1, except that natural graphite is used as the negative electrode active material in Example 22 and a mixture of CuS, $Cu_2S$ and CuO is used as the additive therein, wherein CuO accounts for 5% of the total mass of the additive.

EXAMPLE 23

The preparation method is the same as that of Example 1, except that lithium manganate is used as the positive active material in Example 23 manganate and a mixture of CuS, $Cu_2S$ and CuO is used as the additive therein, wherein CuO accounts for 5% of the total mass of the additive.

EXAMPLE 24

The preparation method is the same as that of Example 1, except that lithium nickel manganate is used as the positive active material in Example 24 manganate and a mixture of CuS, $Cu_2S$ and CuO is used as the additive therein, wherein CuO accounts for 5% of the total mass of the additive.

EXAMPLE 25

The preparation method is the same as that of Example 1, except that lithium nickel cobalt manganate is used as the positive active material in Example 25 manganate and a mixture of CuS, $Cu_2S$ and CuO is used as the additive therein, wherein CuO accounts for 5% of the total mass of the additive.

EXAMPLE 26

The preparation method is the same as that of Example 1, except that a mixture of CuS, $Cu_2S$ and CuO is used as the additive in Example 26, wherein CuO accounts for 5% of the total mass of the additive and an electrolyte containing DMC and EC is used as the electrolyte.

EXAMPLE 27

The preparation method is the same as that of Example 1, except that a mixture of CuS, $Cu_2S$ and CuO is used as the additive in Example 27, wherein CuO accounts for 5% of the total mass of the additive and an electrolyte containing EMC and DEC is used as the electrolyte.

EXAMPLE 28

The preparation method is the same as that of Example 1, except that a mixture of CuS, $Cu_2S$ and CuO is used as the additive in Example 28, wherein CuO accounts for 5% of the total mass of the additive and an electrolyte containing EC, PC and FEC is used as the electrolyte.

EXAMPLE 29

The preparation method is the same as that of Example 1, except that a mixture of CuS, $Cu_2S$ and CuO is used as the additive in Example 29, wherein CuO accounts for 5% of the total mass of the additive and an electrolyte containing EC, PC and VC is used as the electrolyte.

COMPARATIVE EXAMPLE 1

The preparation method is the same as that of Example 1, except that no additive is used in Comparative Example 1.

COMPARATIVE EXAMPLE 2

The preparation method is the same as that of Example 1, except that no additive is used in Comparative Example 2 and lithium manganate is used as the positive active material manganate.

COMPARATIVE EXAMPLE 3

The preparation method is the same as that of Example 1, except that no additive is used in Comparative Example 2 and lithium nickel manganate is used as the positive active material manganate.

COMPARATIVE EXAMPLE 4

The preparation method is the same as that of Example 1, except that no additive is used in Comparative Example 2 and lithium nickel cobalt manganate is used as the positive active material manganate.

Cycle Performance Test

The lithium ion battery prepared by using all of the examples and the comparative examples is repeatedly charged and discharged by the following steps, and the discharge capacity retention rate of the lithium ion battery is calculated.

First, in the environment of 25° C., the first charge and discharge are performed, constant current and constant voltage charging are performed at a charging current of 0.7 C (that is, the current value of the theoretical capacity is completely discharged within 2 h) until the upper limit voltage is 4.4 V, then a constant current discharge is performed at a discharge current of 0.5 C until the final voltage is 3 V, and the discharge capacity of the initial cycle is recorded; subsequently, the charge and discharge cycle is performed for 300 times, and the discharge capacity at the 300th cycle is recorded.

Cycle capacity retention rate=(discharge capacity at 300th cycle/discharge capacity of initial cycle)× 100%.

The measurement results of the respective examples and comparative examples are shown in Table 1 below. For convenience of comparison, the results of Table 1 are shown in groups, and the results of Example 6 are shown in different groups.

TABLE 1

| | type of additive | content of additive | position of additive | morphology of additive | nanosheet thickness/nm | negative electrode active material | positive active material | solvent contained in electrolyte | negative capacity (mAh/g) | impedance (20% SOC, mohm) | cycle expansion rate % for 300 cycles | cycle capacity retention rate for 300 cycles |
|---|---|---|---|---|---|---|---|---|---|---|---|---|
| Examples | | | | | | | | | | | | |
| 1 | CuS | 1 wt % | surface of negative electrode active material layer | clustered shape formed by nanosheets | 20.0 | mesocarbon microbead | lithium cobaltate | EC + PC | 370 | 65 | 2.9 | 89 |
| 2 | $FeS_2$ | 1 wt % | surface of negative electrode active material layer | clustered shape formed by nanosheets | 20.0 | mesocarbon microbead | lithium cobaltate | EC + PC | 365 | 68 | 2.8 | 87 |
| 3 | $MoS_2$ | 1 wt % | surface of negative electrode active material layer | clustered shape formed by nanosheets | 20.0 | mesocarbon microbead | lithium cobaltate | EC + PC | 367 | 70 | 2.7 | 88 |
| 4 | $CuS/Cu_2S$ | 1 wt % | surface of negative electrode active material layer | clustered shape formed by nanosheets | 20.0 | mesocarbon microbead | lithium cobaltate | EC + PC | 369 | 65 | 2.9 | 91 |
| 5 | $CuS/Cu_2S/Fe_3O_4$ | 1 wt % | surface of negative electrode active material layer | clustered shape formed by nanosheets | 20.0 | mesocarbon microbead | lithium cobaltate | EC + PC | 373 | 65 | 2.8 | 89 |
| 6 | $CuS/Cu_2S/CuO$ | 1 wt % | surface of negative electrode active material layer | clustered shape formed by nanosheets | 20.0 | mesocarbon microbead | lithium cobaltate | EC + PC | 368 | 63 | 2.7 | 89 |
| 7 | $CuS/Cu_2S/Cu_2O/CuO$ | 1 wt % | surface of negative electrode active material layer | clustered shape formed by nanosheets | 20.0 | mesocarbon microbead | lithium cobaltate | EC + PC | 370 | 65 | 2.7 | 90 |

TABLE 1-continued

| | type of additive | content of additive | position of additive | morphology of additive | nanosheet thickness/nm | negative electrode active material | positive active material | solvent contained in electrolyte | negative capacity (mAh/g) | impedance (20% SOC, mohm) | cycle expansion rate % for 300 cycles | cycle capacity retention rate for 300 cycles |
|---|---|---|---|---|---|---|---|---|---|---|---|---|
| 8 | CuS/Cu$_2$S/CuO | 0.1 wt % | surface of negative electrode active material layer | clustered shape formed by nanosheets | 20.0 | mesocarbon microbead | lithium cobaltate | EC + PC | 351 | 73 | 2.5 | 85 |
| 5 | CuS/Cu$_2$S/CuO | 1 wt % | surface of negative electrode active material layer | clustered shape formed by nanosheets | 20.0 | mesocarbon microbead | lithium cobaltate | EC + PC | 373 | 65 | 2.8 | 89 |
| 9 | CuS/Cu$_2$S/CuO | 2 wt % | surface of negative electrode active material layer | clustered shape formed by nanosheets | 20.0 | mesocarbon microbead | lithium cobaltate | EC + PC | 380 | 56 | 3.2 | 92 |
| 10 | CuS/Cu$_2$S/CuO | 4 wt % | surface of negative electrode active material layer | clustered shape formed by nanosheets | 20.0 | mesocarbon microbead | lithium cobaltate | EC + PC | 388 | 50 | 3.8 | 95 |
| 11 | CuS/Cu$_2$S/CuO | 6 wt % | surface of negative electrode active material layer | clustered shape formed by nanosheets | 20.0 | mesocarbon microbead | lithium cobaltate | EC + PC | 395 | 48 | 4.7 | 94 |
| 12 | CuS/Cu$_2$S/CuO | 1 wt % | in negative electrode active material layer | clustered shape formed by nanosheets | 20.0 | mesocarbon microbead | lithium cobaltate | EC + PC | 374 | 62 | 2.9 | 88 |
| 5 | CuS/Cu$_2$S/CuO | 1 wt % | surface of negative electrode active material layer | clustered shape formed by nanosheets | 20.0 | mesocarbon microbead | lithium cobaltate | EC + PC | 373 | 65 | 2.8 | 89 |
| 13 | CuS/Cu$_2$S/CuO | 1 wt % | in + on surface of negative electrode active material layer | clustered shape formed by nanosheets | 20.0 | mesocarbon microbead | lithium cobaltate | EC + PC | 374 | 64 | 2.8 | 89 |

TABLE 1-continued

| | type of additive | content of additive | position of additive | morphology of additive | nanosheet thickness/nm | negative electrode active material | positive active material | solvent contained in electrolyte | negative capacity (mAh/g) | impedance (20% SOC, mohm) | cycle expansion rate % for 300 cycles | cycle capacity retention rate for 300 cycles |
|---|---|---|---|---|---|---|---|---|---|---|---|---|
| 14 | CuS/Cu$_2$S/CuO | 1 wt % | surface of negative electrode active material layer | nanosheet | 20.0 | mesocarbon microbead | lithium cobaltate | EC + PC | 373 | 63 | 2.8 | 87 |
| 15 | CuS/Cu$_2$S/CuO | 1 wt % | surface of negative electrode active material layer | nanostick | 20.0 | mesocarbon microbead | lithium cobaltate | EC + PC | 373 | 63 | 2.8 | 88 |
| 16 | CuS/Cu$_2$S/CuO | 1 wt % | surface of negative electrode active material layer | nano particle | 20.0 | mesocarbon microbead | lithium cobaltate | EC + PC | 373 | 63 | 2.9 | 87 |
| 5 | CuS/Cu$_2$S/CuO | 1 wt % | surface of negative electrode active material layer | clustered shape formed by nanosheets | 20.0 | mesocarbon microbead | lithium cobaltate | EC + PC | 373 | 65 | 2.8 | 89 |
| 17 | CuS/Cu$_2$S/CuO | 1 wt % | surface of negative electrode active material layer | clustered shape formed by nanosheets | 1.0 | mesocarbon microbead | lithium cobaltate | EC + PC | 374 | 64 | 2.7 | 87 |
| 18 | CuS/Cu$_2$S/CuO | 1 wt % | surface of negative electrode active material layer | clustered shape formed by nanosheets | 10.0 | mesocarbon microbead | lithium cobaltate | EC + PC | 373 | 65 | 2.8 | 88 |
| 5 | CuS/Cu$_2$S/CuO | 1 wt % | surface of negative electrode active material layer | clustered shape formed by nanosheets | 20.0 | mesocarbon microbead | lithium cobaltate | EC + PC | 373 | 65 | 2.8 | 89 |
| 19 | CuS/Cu$_2$S/CuO | 1 wt % | surface of negative electrode active material layer | clustered shape formed by nanosheets | 50.0 | mesocarbon microbead | lithium cobaltate | EC + PC | 373 | 65 | 2.8 | 89 |

TABLE 1-continued

| | type of additive | content of additive | position of additive | morphology of additive | nanosheet thickness/nm | negative electrode active material | positive active material | solvent contained in electrolyte | negative capacity (mAh/g) | impedance (20% SOC, mohm) | cycle expansion rate % for 300 cycles | cycle capacity retention rate for 300 cycles |
|---|---|---|---|---|---|---|---|---|---|---|---|---|
| 20 | CuS/Cu$_2$S/CuO | 1 wt % | surface of negative electrode active material layer | clustered shape formed by nanosheets | 200.0 | mesocarbon microbead | lithium cobaltate | EC + PC | 373 | 67 | 2.8 | 89 |
| 21 | CuS/Cu$_2$S/CuO | 1 wt % | surface of negative electrode active material layer | clustered shape formed by nanosheets | 20.0 | artificial graphite | lithium cobaltate | EC + PC | 378 | 64 | 3.0 | 89 |
| 22 | CuS/Cu$_2$S/CuO | 1 wt % | surface of negative electrode active material layer | clustered shape formed by nanosheets | 20.0 | natural graphite | lithium cobaltate | EC + PC | 370 | 66 | 3.2 | 87 |
| 5 | CuS/Cu$_2$S/CuO | 1 wt % | surface of negative electrode active material layer | clustered shape formed by nanosheets | 20.0 | mesocarbon microbead | lithium cobaltate | EC + PC | 373 | 65 | 2.8 | 89 |
| 23 | CuS/Cu$_2$S/CuO | 1 wt % | surface of negative electrode active material layer | clustered shape formed by nanosheets | 20.0 | mesocarbon microbead | lithium manganate | EC + PC | 373 | 66 | 2.8 | 87 |
| 24 | CuS/Cu$_2$S/CuO | 1 wt % | surface of negative electrode active material layer | clustered shape formed by nanosheets | 20.0 | mesocarbon microbead | lithium nickel manganate | EC + PC | 373 | 66 | 2.8 | 88 |
| 25 | CuS/Cu$_2$S/CuO | 1 wt % | surface of negative electrode active material layer | clustered shape formed by nanosheets | 20.0 | mesocarbon microbead | lithium nickel cobalt manganate | EC + PC | 373 | 65 | 2.8 | 89 |
| 5 | CuS/Cu$_2$S/CuO | 1 wt % | surface of negative electrode active material layer | clustered shape formed by nanosheets | 20.0 | mesocarbon microbead | lithium cobaltate | EC + PC | 373 | 65 | 2.8 | 89 |

TABLE 1-continued

| | type of additive | content of additive | position of additive | morphology of additive | nanosheet thickness/nm | negative electrode active material | positive active material | solvent contained in electrolyte | negative capacity (mAh/g) | impedance (20% SOC, mohm) | cycle expansion rate % for 300 cycles | cycle capacity retention rate for 300 cycles |
|---|---|---|---|---|---|---|---|---|---|---|---|---|
| 25 | CuS/Cu₂S/CuO | 1 wt % | surface of negative electrode active material layer | clustered shape formed by nanosheets | 20.0 | mesocarbon microbead | lithium cobaltate | EC + PC | 373 | 65 | 2.8 | 89 |
| 26 | CuS/Cu₂S/CuO | 1 wt % | surface of negative electrode active material layer | clustered shape formed by nanosheets | 20.0 | mesocarbon microbead | lithium cobaltate | DMC + DC | 373 | 65 | 2.8 | 89 |
| 27 | CuS/Cu₂S/CuO | 1 wt % | surface of negative electrode active material layer | clustered shape formed by nanosheets | 20.0 | mesocarbon microbead | lithium cobaltate | EMC + DEC | 373 | 64 | 2.8 | 88 |
| 28 | CuS/Cu₂S/CuO | 1 wt % | surface of negative electrode active material layer | clustered shape formed by nanosheets | 20.0 | mesocarbon microbead | lithium cobaltate | EC + PC + FEC | 373 | 66 | 2.8 | 89 |
| 29 | CuS/Cu₂S/CuO | 1 wt % | surface of negative electrode active material layer | clustered shape formed by nanosheets | 20.0 | mesocarbon microbead | lithium cobaltate | EC + PC + VC | 373 | 66 | 2.8 | 90 |
| Comparative Examples | | | | | | | | | | | | |
| 1 | — | — | — | — | — | mesocarbon microbead | lithium cobaltate | EC + PC | 350 | 75 | 2.5 | 85 |
| 2 | — | — | — | — | — | mesocarbon microbead | lithium manganate | EC + PC | 350 | 77 | 2.5 | 83 |
| 3 | — | — | — | — | — | mesocarbon microbead | lithium nickel manganate | EC + PC | 350 | 78 | 2.6 | 84 |
| 4 | — | — | — | — | — | mesocarbon microbead | lithium nickel cobalt manganate | EC + PC | 350 | 73 | 2.7 | 83 |

As is apparent from Table 1, it can be seen from the results of Examples 1 to 7 that by changing the amount of the additive and the type of the additive, when a sulfide is contained in the additive, the capacity and the cycle performance are high while the impedance being low. This is because the sulfur ion may precipitate the positive electrode metal ion and prevent dissolution on the surface of the negative electrode, thereby effectively improving the cycle performance of the lithium ion battery; the capacity of the lithium ion battery is further improved, the impedance is lowered, and the cycle performance of the lithium ion battery is improved.

In addition, when the additive contains CuS or $Cu_2S$, the capacity and cycle performance of the lithium ion battery are generally higher than that when the additive does not contain CuS and $Cu_2S$ and the impedance is kept low, so the lithium ion battery has the best performance. This is because CuS and $Cu_2S$ may be combined with a carbon material capable of intercalating and deintercalating lithium, so that the carbon material may exist in the gap between the copper sulfide and cuprous sulfide composed of the nanosheet to form an effective conductive network, thereby promoting ion and electron transport during charge and discharge and effectively improving the conductivity of materials; and also, it provides a fast path for the transmission of electrons and ions, alleviates the volume expansion of the negative electrode material during charge and discharge, and further improves the cycle performance of the lithium ion battery.

By comparing the results of Example 5 with the results of Comparative Example 1 (without adding the additive), it is understood that when CuS, $Cu_2S$, and CuO are used as additives, the lithium ion battery has a higher capacity, lower impedance, and improved circle performance. This is because CuS and $Cu_2S$ are not only highly conductive but also may intercalate/deintercalate lithium, which is beneficial for lowering the impedance and exerting a higher capacity; and the sulfur ion may precipitate the positive electrode metal ion and prevent dissolution on the surface of the negative electrode so as to lower the impedance and improve the cycle performance of lithium ion battery while further increasing the capacity of lithium ion battery.

According to the results of Example 5 and the results of Examples 8 to 11, it can be seen that by determining the type of the additive and changing the additive content, it is found that when the content of the additive is 0.1% to 6%, the performance of the lithium ion battery is better, that is, the impedance is lowered while the capacity and the battery cycle performance are high. When the percentage of the additive to the total mass of the material of the negative electrode active material layer is less than 0.1%, the improvement in the performance of the lithium ion battery may not be remarkable because the content is too small. On the other hand, when the percentage is higher than 6%, $S^{2-}$ is easily reduced to consume electrons, and causes a large expansion, thereby deteriorating the performance of the lithium ion battery. Preferably, the additive accounts for 1% of the total mass of the material of the negative electrode active material layer, and the impedance is low while the capacity and the cycle retention rate are kept high.

According to the results of Example 5 and the results of Examples 12 to 13, it can be seen that regardless of whether the additive is mixed with the material of the active material layer or coated on the surface of the active material layer, the performance of the lithium ion battery may be effectively improved and the impedance may be reduced while maintaining a high capacity and cycle performance of the lithium ion battery; and as can be seen from Examples 12 and 13, when the additive is mixed with the material of the negative electrode active material layer, the conductive agent may not be added, because the additive may form an effective conductive network structure with the carbon material, promote ion and electron transport during charge and discharge, and effectively improve the conductivity of the material, thus no conductive agent is needed.

According to the results of Example 5 and the results of Examples 14 to 16, it is understood that when the morphology of the additive is nanosheet, nanorod, nano particle or cluster formed of nanosheets, the performance of lithium ion battery may be effectively improved; in particular, when the morphology of the additive is a cluster formed of nanosheets, the cycle performance is optimal. This is because the clustered surface morphology may effectively improve the defects that CuS and $Cu_2S$ lead to low utilization of the active material and the poor reversibility of the electrode reaction due to its own volume effect, thereby improving the conductivity of the material; and the morphology may alleviate the volume expansion caused by repeated intercalation of lithium ions, so that the volume change of the lithium ion battery is further reduced so as to further improve the cycle performance thereof.

According to the results of Example 5 and the results of Examples 17 to 20, it is understood that when the thickness of the nanosheets constituting the additive is in the range of 1 to 200 nm, the prepared lithium ion battery has a lower impedance while maintaining a high capacity and cycle performance. This is because the structure orientation of CuS and $Cu_2S$ composed of nanosheets with a thickness of 1 to 200 nm is optimal, and the electrode having the structure exhibits an excellent cycle performance and may improve the conductivity of the material so that the utilization rate of the active material is further improved; when the thickness of the nanosheet is less than 1 nm, it is difficult to form a conductive network structure with the carbon material, thereby reducing the conductivity of the material, so that the capacity of the lithium ion battery is low; when the thickness of the nanosheet is greater than 200 nm, the transport of ions and electrons is hindered because the thickness of the nanosheet is too large, so that the volume expansion of the negative electrode material during charging and discharging becomes large, which reduces the cycle performance of the material.

Further, the additive has a particle diameter of 1 to 50 μm. When the particle size is less than 1 μm, the specific surface area is large, the side reaction is increased to attenuate the cycle capacity. When the particle size exceeds 50 μm, the lithium ion transport path in the solid phase becomes long, and the polarization resistance will be also increased.

According to the results of Example 5 and the results of Examples 21 to 22, it is understood that when the additive is determined, it can be seen that by changing the negative electrode active material, the change of the negative electrode active material does not significantly affect the performance of the lithium ion battery. Of course, using different negative electrode active materials may cause slightly different results. This is because the carbon material capable of intercalating and deintercalating lithium may be combined with both the copper sulfide (CuS) and cuprous sulfide ($Cu_2S$) to form a negative electrode material for the lithium ion battery, and the stable structure thereof is suitable for storing lithium ions. And the larger specific surface area of the structure may reduce the transport path of ions, and has a certain mitigation effect on volume expansion during charge and discharge while the volume change being small in the process of lithium ion intercalation, further improving the performance of lithium ion battery.

According to the results of Example 5 and the results of Examples 23 to 25, it is understood that when the additive is determined, the performance of lithium ion battery may still be effectively improved upon the positive active material containing the manganese ion. Further, by comparing the results of Examples 23 to 25 with the results of Comparative Examples 2 to 4, it is understood that the capacity and cycle performance when the additive is added are remarkably higher than the capacity and cycle performance when no additive is added, and the impedance is lower. This is because the coating formed by the additive is better at precipitating manganese ions when it is on the surface. Therefore, while maintaining the high capacity and cycle performance of the lithium ion battery, the impedance is lowered.

According to the results of Example 5 and the results of Examples 26 to 29, it is understood that the change in the kind of the electrolyte may not significantly affect the performance of the lithium ion battery. Therefore, when other conditions are determined, a change may be made to the kind of the electrolyte.

It can be seen from Table 1 that the cycle performance of the negative electrode with the additive provided by the examples of the present application is greatly improved, the capacity thereof is increased to about 373 mAh/g, and the capacity retention rate for 300 cycles is about 90%, and the impedance is kept low, so that the storage performance of the lithium ion battery is effectively improved.

Figure 2:
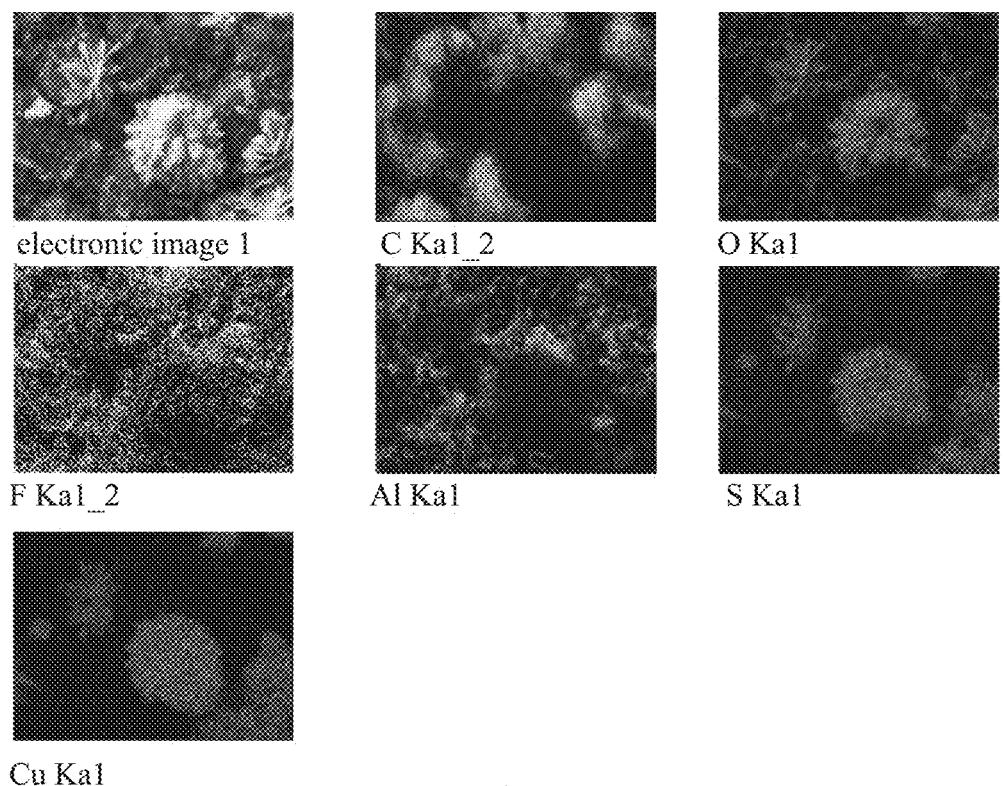
FIG. 2 shows a scanning electronic microscope energy spectrum (EDS) image of a negative electrode material at 1000 times magnification according to Example 5 of the present application.

In addition, after the scanning electronic microscope (SEM) image and the scanning electronic microscope energy spectrum (EDS) image of the negative electrode prepared in Example 5 of the present application were observed at 1000 times magnification, the morphology of the additive may be seen from FIG. 1 and FIG. 2, and further, the agglomeration phenomenon may not occur in the additive, that is, the particle dispersion is relatively uniform.

Those skilled in the art will appreciate that the above-described examples are merely exemplary examples, and various changes, substitutions and changes may be made without departing from the spirit and scope of the present application.

What is claimed is:

1. A negative electrode, comprising:
a negative electrode active material layer,
and an additive;
the additive comprises a metal sulfide,
wherein the additive comprises at least three of copper sulfide, cuprous sulfide, copper oxide, and cuprous oxide.

2. The negative electrode according to claim 1, wherein the additive accounts for 0.1% to 6% of the total mass of the negative electrode active material layer and the additive; and the additive has a particle diameter of 1 µm to 50 µm.

3. The negative electrode according to claim 1, wherein the additive is distributed in the negative electrode active material layer, distributed on the surface of the negative electrode active material layer, or both in the negative electrode active material layer and on the surface of the negative electrode active material layer.

4. The negative electrode according to claim 1, wherein the metal sulfide comprises one or more of copper sulfide, cuprous sulfide, molybdenum disulfide, and iron disulfide.

5. The negative electrode according to claim 1, wherein the morphology of the additive comprises one or more of nanosheets, nanorods, nanotubes, nanowires, nanoparticles, clusters formed of nanosheets.

6. The negative electrode according to claim 5, wherein the nanosheet has a thickness of 1 nm to 200 nm.

7. The negative electrode according to claim 1, wherein the additive further comprises a metal oxide having a chemical formula of $M_xO_y$; M is selected from at least one of Co, Mn, Ni, Cu and Fe, x is an integer of 1 to 3, and y is an integer of 1 to 4.

8. The negative electrode according to claim 1, wherein inorganic particles are distributed on the surface of the negative electrode active material layer.

9. The negative electrode according to claim 8, wherein the inorganic particles are one or more of $Al_2O_3$, $SiO_2$, MgO, $TiO_2$, $ZrO_2$, BaO, magnesium hydroxide, and boehmite.

10. A lithium ion battery, comprising a negative electrode, wherein the negative electrode comprises:
a negative electrode active material layer,
and an additive;
the additive comprises a metal sulfide,
wherein the additive comprises at least three of copper sulfide, cuprous sulfide, copper oxide, and cuprous oxide.

11. The lithium ion battery according to claim 10, wherein the additive accounts for 0.1% to 6% of the total mass of the negative electrode active material layer and the additive; and the additive has a particle diameter of 1 µm to 50 µm.

12. The lithium ion battery according to claim 10, wherein the additive is distributed in the negative electrode active material layer, distributed on the surface of the negative electrode active material layer, or both in the negative electrode active material layer and on the surface of the negative electrode active material layer.

13. The lithium ion battery according to claim 10, wherein the metal sulfide comprises one or more of copper sulfide, cuprous sulfide, molybdenum disulfide, and iron disulfide.

14. The lithium ion battery according to claim 10, wherein the morphology of the additive comprises one or more of nanosheets, nanorods, nanotubes, nanowires, nanoparticles, clusters formed of nanosheets.

15. The lithium ion battery according to claim 14, wherein the nanosheet has a thickness of 1 nm to 200 nm.

16. The lithium ion battery according to claim 10, wherein the additive further comprises a metal oxide having a chemical formula of $M_xO_y$; M is selected from at least one of Co, Mn, Ni, Cu and Fe, x is an integer of 1 to 3, and y is an integer of 1 to 4.

17. The lithium ion battery according to claim 10, wherein inorganic particles are distributed on the surface of the negative electrode active material layer.

18. The lithium ion battery according to claim 17, wherein the inorganic particles are one or more of $Al_2O_3$, $SiO_2$, MgO, $TiO_2$, $ZrO_2$, BaO, magnesium hydroxide, and boehmite.

* * * * *